Patented Feb. 3, 1948

2,435,464

UNITED STATES PATENT OFFICE 2,435,464

MOISTUREPROOF POLYVINYL FILMS

Milton R. Radcliffe, Glen Rock, N. J., assignor to The Firestone Tire & Rubber Company, Akron, Ohio, a corporation of Ohio No Drawing. Application March 11, 1944, Serial No. 526,119

1 Claim. (Cl. 260—36)

This invention relates to polyvinyl chloride and polyvinyl chloride-copolymer films, and more particularly to such films having a high degree of resistance to the passage of moisture therethrough.

Films of polyvinyl chloride and polyvinyl chloride-acetate have been commercially produced for a number of years, and have attained wide acceptance on account of their flexibility, extensibility, transparence, attractive appearance, thermoplasticity, tenacity and other desirable properties. However, such films are relatively water vapor permeable, which is a serious disadvantage for the purpose of packaging materials and objects which are deteriorated by contact with, or absorption or loss of, moisture. Thus the packaging of dehydrated foods, frozen foods, bakery goods, delicate machinery and machine-components, and the like have hitherto been closed fields to the vinyl films, at least when in competition with the more efficient rubber hydrochloride films.

With a view to improving the moisture transmission resistance of vinyl films, it may be observed that regenerated cellulose films are commercially moistureproofed to a substantial degree by coating them with nitrocellulose lacquers containing paraffin wax. This technique is inapplicable to vinyl films, if for no other reason than that the lacquer solvent would spoil the vinyl film. It might also be suggested that vinyl resins could be formulated with paraffin or like waxes to develop integral moisture resistance in films made therefrom. However, due to the peculiar nature of the vinyl resins, none of the waxes which would ordinarily suggest themselves for this purpose are satisfactory. For instance, the present applicant (patentee) has prepared a large number of vinyl resin formulations containing varying proportions of various paraffin and ester waxes. Films prepared from these formulations exhibited substantially no improved moisture resistance. Somewhat better results were secured when the waxes were blended into the formulations by means of rosin and similar substances; however, this latter technique must be carefully carried out, and further the proportions of ingredients must be adjusted in accordance with the thickness of the film proposed to be made, in order to secure consistent and satisfactory results. Such care and adjustment would be disadvantageous in ordinary manufacturing practice.

Accordingly it is an object of this invention to provide polyvinyl films which will have a high degree of resistance to the passage of moisture therethrough.

Another object is to provide such films having a moisture proofing agent integrally incorporated thereinto.

A further object is to obtain a moisture proofing effect in such films by the use of materials which are readily and cheaply procurable from reliable domestic sources.

A still further object is to secure a moisture proofing effect upon such films by means of simple manipulations and without necessity for careful and exact control of ingredients and processing.

The foregoing and other objects are secured, in accordance with this invention, by the incorporation of a modicum of a higher fatty dialkyl ether, the alkyl radicals of which each contain from 12 to 18 carbon atoms, into a polyvinyl chloride or like resin. The polyvinyl resin, containing the ether, is calendered or otherwise worked up into a film, which film will be found to have a far higher resistance to the passage of moisture therethrough than any other polyvinyl film heretofore manufactured, surpassing, in many cases, the moisture-resistance of the rubber hydrochloride films, heretofore regarded as the most highly moisture-resistant films obtainable on the market.

Referring to the polyvinyl chloride resins, films of which may be moistureproofed in accordance with this invention, these may be any of the polymers of vinyl chloride, or copolymers of vinyl chloride with substantial but minor proportions of other unsaturates copolymerizable therewith. Unsaturated compounds which may be copolymerized with vinyl chloride to yield resins suitable for the practice of this invention are exemplified in the vinyl esters, ethers, and aryl substituted products; acrylic and like esters and nitriles; vinylidene chloride; and conjugated diolefins, such as butadiene, chloroprene and the like.

Examples of specific vinyl chloride type polymeric materials which may be compounded to form moistureproof films in accordance with this invention are straight polyvinyl chloride; copolymers of vinyl chloride with vinyl acetate; of vinyl chloride with vinyl ethyl, butyl, etc., ethers; and of vinyl chloride with acrylonitrile, vinylidene chloride, methyl methacrylate, styrene, coumarone, indene and the like. Ternary copolymers may likewise be employed, such as a copolymer of vinyl chloride, vinyl acetate and vinylidene chloride. Instead of the pure vinyl polymers and copolymers just outlined, there may obviously be employed mixtures of two or more vinyl polymers or copolymers, or mixtures of such polymers or copolymers with other compatible resins. Likewise the formulations may contain any of the usual plasticizers, stabilizers, modifiers and the like. It is understood that, in the compositions above indicated, the elements of vinyl chloride shall be predominant, making up at least 60% of all the resinous components, exclusive of plasticizers. Such compositions will be generically designated hereinafter as "vinyl chloride type resins."

Referring to the higher fatty alkyl ethers to be compounded with vinyl chloride type resins to develop moisture-resistant properties according to this invention, these may be any alkyl ethers, each alkyl group of which contains from 10 to 18 carbon atoms. Suitable ethers must be further characterized by having melting points above room temperature. Preferably, the number of carbon atoms in the ether should total from 28 to 36 carbon atoms, since the use of ethers in this more particular range results in the development of very high degrees of moisture resistance in the polymer films, approaching, and in some instances surpassing, the moisture resistance of similar rubber hydrochloride films. Suitable ethers are exemplified in dilauryl ether, dimyristyl ether, dicetyl ether, distearyl ether, lauryl stearyl ether, lauryl cetyl ether, myristyl cetyl ether, and the like. Obviously, instead of the pure ethers, there may be employed mixtures of ethers of the types above indicated as suitable, for instance mixed ethers synthesized from the fatty alkyl radicals derived from the natural oils, fats and waxes, such as coconut oil, tallow, hydrogenated fish oil and the like.

The amounts of the higher ethers to be incorporated into polyvinyl chloride type polymers according to this invention will vary somewhat, depending upon the exact composition and degree of polymerization of the polymer employed; the degree of moisture proofing desired; the nature of the higher fatty ether moisture-proofing agent; and the nature and amounts of plasticizers and other materials in the compound. Accordingly, this amount is best determined in each case by preliminary small-scale experiment. As a general rule, it will be noted that, for any given higher fatty ether used in connection with any given vinyl chloride type polymer, there will be a maximum degree of waterproofing effect obtained with a certain percentage of the ether. This effect will decrease with the use of greater or less percentages of ether. This optimum percentage will in general be lower with the higher homologs of the ethers. Thus with dilauryl ether, the maximum moisture proofing effect will be obtained with the use of about 2% of the ether on the basis of the total weight of the film; with dicetyl ether the maximum effect will be obtained with about 1.5% of ether. In general, best results will be secured by the use of from about .5% to about 3.0% of ether, based on the weight of the film.

As noted above, the vinyl chloride type resins employed in this invention may be compounded with any of the usual plasticizers such as dialkyl phthalates, trialkyl or triaryl phosphates, dialkyl or diaryl esters of aliphatic dibasic acids, aryl alkyl polyethers, fatty acid esters and the like. Such plasticizers do not materially interfere with the moistureproofing of compositions in accordance with this invention, although they may somewhat alter the optimum proportions in which the fatty ether should be used. Least interference with the moistureproofing is secured by the employment of plasticizers having symmetrical molecular configurations, such as dibutyl sebacate, trioctyl phosphate, tricresyl phosphate, dicresyl carbitol, etc.

The incorporation of the higher fatty ethers into the vinyl chloride type polymer mass may be effected in any appropriate manner. Since vinyl chloride type films are conveniently prepared by calendering, the higher fatty ether may be compounded with the vinyl chloride polymer mass in any convenient type of mill, such as a heated roll mill, Banbury mixer, or the like. The ethers are readily and stably compatible with the vinyl chloride type resin, and no special devices, techniques or precautions are necessary to effect the compounding or to secure the stability of the compounds. This last feature is of obvious great advantage in the commercial production of films in the usual types of manufacturing establishments.

Polyvinyl chloride type films containing higher fatty ether moisture-proofing agents according to this invention are characterized in all instances by far higher degrees of moisture-resistance than have hitherto been attained in this type of film. By the use of ethers in the preferred range, i. e., those containing a total of from 28 to 36 carbon atoms per molecule, it is possible to secure degrees of moisture proofing approaching, and in some cases surpassing, the moisture resistance of rubber hydrochloride films. This invention thus makes the polyvinyl films available for many purposes for which they have hitherto been non-competing, for instance in packaging dehydrated foods, frozen foods, bakery goods, delicate machinery and machine components, etc. The films are readily and reliably heat-sealing on conventional machinery. The films are made entirely from the domestically produced vinyl resins, plasticizers, and higher fatty ethers.

With the above general discussion in mind, there are given herewith detailed examples of specific modes of carrying out this invention. All parts given are by weight.

EXAMPLE I

| | |
|---|---|
| Vinyl chloride — vinylidene chloride copolymer resin (containing 86% vinyl chloride, and 14% vinylidene chloride) | 80 parts |
| Dioctyl phthalate | 17 parts |
| Stabilizer | 1.5 parts |
| Higher fatty ether (dilauryl ether or dimyristyl ether, or dicetyl ether or distearyl ether) | .5, .75, 1.0, 1.5, 1.25, 1.75 or 2.0 parts |

A series of compounds were made up in accordance with the foregoing schedule, using each of the dilauryl, dicetyl, etc., ethers in each of the proportions ".5," ".75," etc., parts indicated, thus making 28 separate compounds in all. The compounds were all prepared on a laboratory roll mill heated at 140° C. and were all sheeted out on a calender to form films .002" thick. The moisture transmission coefficient of each film was determined by noting the amount of water vapor passing through the film when air saturated with water vapor at 25° C. was maintained on one side of the film and dry air at 25° C. was maintained on the other side. The results, expressed as grams of moisture per square meter per day, are tabulated in Table I. For comparison, a typical value for a commercial rubber hydrochloride film is 3 grams per square meter per day, and a typical value for a vinyl chloride film in accordance with the above formula, but without the higher fatty ether is about 24 grams per square meter per day.

Table I

| Fatty Ether Used | Vapor Transmission Coefficient (gm. per sq. m. per day) with the use of— | | | | | | |
|---|---|---|---|---|---|---|---|
| | .5 parts Ether | .75 parts Ether | 1.0 parts Ether | 1.25 parts Ether | 1.5 parts Ether | 1.75 parts Ether | 2.0 parts Ether |
| Dilauryl | 25 | 23 | 21.5 | 20.5 | 20 | [1]19.5 | 19.5 |
| Dimyristyl | 10.0 | 9.0 | 7.5 | 6.5 | [1]6.0 | 6.5 | 7.5 |
| Dicetyl | 6.0 | 4.5 | 3.0 | 2.0 | [1]1.5 | 2.0 | 3.0 |
| Distearyl | 6.0 | 4.0 | [1]3.0 | 3.0 | 3.0 | 3.0 | 3.0 |

[1] Indicates minimum values obtained with any given ether.

From the table, it will be apparent that there are provided novel polyvinyl chloride type films having greatly enhanced moisture resistance as compared to similar films heretofore prepared. In fact, with the dicetyl ethers, it is possible to secure results superior to those obtained with rubber hydrochloride. It will also be noted, as pointed out in the preliminary discussion, that there is a certain optimum value for the concentration of any given ether, above and below which less efficient moisture proofing is secured.

EXAMPLE II

A

| | Parts |
|---|---|
| Vinyl chloride—vinylidene chloride copolymer (containing 94% of vinyl chloride, and 6% vinylidene chloride) | 76.0 |
| Dioctyl phthalate | 21.0 |
| Stabilizer (lead oleate) | 1.5 |
| Dicetyl ether | 1.5 |
| | 100.0 |

Moisture vapor transmission coefficient, 1 gm./sq. m./da.

B

| | Parts |
|---|---|
| Vinyl chloride—vinylidene chloride copolymer (containing 94% of vinyl chloride, and 6% of vinylidene chloride) | 84.0 |
| Dioctyl phthalate | 13.0 |
| Stabilizer (lead oleate) | 1.5 |
| Dicetyl ether | 1.5 |
| | 100.0 |

Moisture vapor transmission coefficient, 2 gm./sq. m./da.

C

| | Parts |
|---|---|
| Vinyl chloride—vinylidene chloride copolymer resin (containing 94% of vinyl chloride, and 6% of vinylidene chloride) | 76 |
| Glyceryl dicresyl ether | 21 |
| Stabilizer (lead oleate) | 1.5 |
| Dimyristyl ether | 1.5 |
| | 100.0 |

Moisture vapor transmission coefficient @ 20° C., 2 gm./sq. m./da.

D

| | Parts |
|---|---|
| Vinyl chloride—vinyl acetate copolymer (containing approximately 88.5–90.5% vinyl chloride, the balance being vinyl acetate) | 80.5 |
| Dioctyl phthalate | 17.0 |
| Stabilizer (lead oleate) | 1.5 |
| Distearyl ether | 1.0 |
| | 100.0 |

Moisture vapor transmission coefficient @ 20° C., 3.5 gm./sq. m./da.

The formulations set forth at A, B, C and D were individually compounded on a laboratory roll mill and calendered out into films .002" thick. The moisture vapor transmission coefficient was determined for each film as described in Example I and is set forth immediately below the formula of the compound from which it was elaborated. Similar films prepared without inclusion of ether had moisture vapor transmission coefficient in the range 20–30 gm/sq. m./da.

EXAMPLE III

| | Parts |
|---|---|
| Polyvinyl chloride | 35.0 |
| Tricresyl phosphate | 14.24 |
| Dicetyl ether | .75 |
| Methyl ethyl ketone | 300.0 |

A solution was made up from the above ingredients, and a film .001" thick cast therefrom on a glass plate. The film had a moisture vapor transmission coefficient of 1.5 gm./sq. m./da. as determined by the method described in Example I. A similar film prepared without inclusion of the ether had a moisture vapor transmission coefficient of 27 gm./sq. m./da.

EXAMPLE IV

COCONUT OIL FRACTION ETHERS

| | |
|---|---|
| Vinyl chloride—vinyl acetate copolymer (containing approximately 88.5–90.5% vinyl chloride, the balance being vinyl acetate) | 80.0 parts |
| Dioctyl phthalate | 17.0 parts |
| Calcium stearate | 1.5 parts |
| Coconut fraction ethers (produced from a fraction of coconut alcohols containing approximately 60% 14-carbon alcohols and 40% 16-carbon alcohols) | 1.2, 1.5, 1.8, 2.1 or 2.4 parts |

A series of five compounds was made up in accordance with the foregoing schedule, using the coconut ethers in each of the proportions 1.2, 1.5, etc., parts indicated. The compounds were all prepared on a laboratory roll mill heated at 140° C., and were all sheeted out on a calender to form films .002" thick. The moisture vapor transmission coefficient of each film was determined by the method of Example I, and the results are tabulated in the following table:

Table II

| Parts of Coconut Ether employed | 1.2 | 1.5 | 1.8 | 2.1 | 2.4 |
|---|---|---|---|---|---|
| Moisture transmission coefficient (g./sq. m./da.) | 2.5 | [1]2.0 | 3.0 | 3.5 | 4.5 |

[1] Minimum value obtained.

A similar film prepared without inclusion of the ether had a transmission coefficient of 23 gm./sq. in./da.

From the foregoing general discussion and detailed examples, it is evident that this invention provides novel polyvinyl films of a distinct and higher order of moisture-resistance when compared to similar films heretofore prepared. The invention makes possible the production, wholly from domestic materials, of films competitive economically and technically with the rubber hydrochloride films. The formulation and elaboration of compounds and films according to this invention require no unfamiliar or excessively precise techniques.

The following is believed to be specifically novel and is desired to be secured by Letters Patent.

I claim:

A self-supporting vinyl chloride-vinylidene chloride copolymer film having enhanced resistance to the passage of water vapor therethrough comprising chiefly a vinyl chloride-vinylidene chloride copolymer containing at least 60% of the elements of vinyl chloride together with 1.5% of dicetyl ether.

MILTON R. RADCLIFFE.

REFERENCES CITED

The following references are of record in the file of this patent:

UNITED STATES PATENTS

| Number | Name | Date |
|---|---|---|
| 2,034,020 | Branchen | Mar. 17, 1936 |
| 2,098,535 | Charch | Nov. 9, 1937 |
| 2,147,629 | Charch | Feb. 21, 1939 |

FOREIGN PATENTS

| Number | Country | Date |
|---|---|---|
| 497,001 | Great Britain | Dec. 6, 1938 |